(12) United States Patent
Lee et al.

(10) Patent No.: US 7,573,681 B2
(45) Date of Patent: Aug. 11, 2009

(54) HGA PROTECTING METHOD AND MEMBER AND METHOD OF IMPLEMENTING THE HGA PROTECTING METHOD AND MEMBER IN A HARD DISK DRIVE

(75) Inventors: Chul-woo Lee, Seongnam-si (KR); Jong-gyu Chae, Daegu Metropolitan (KR); Jae-myung Jung, Suwon-si (KR); Ki-tag Jeong, Hwaseong-si (KR); Sang-chul Shin, Osan-si (KR); Woo-cheol Jeong, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 486 days.

(21) Appl. No.: 11/201,117

(22) Filed: Aug. 11, 2005

(65) Prior Publication Data

US 2006/0034020 A1 Feb. 16, 2006

(30) Foreign Application Priority Data

Aug. 11, 2004 (KR) .................... 10-2004-0063101

(51) Int. Cl.
*G11B 5/48* (2006.01)
*B65D 85/00* (2006.01)

(52) U.S. Cl. .............. 360/245.7; 360/254.3; 360/265.7; 206/728

(58) Field of Classification Search .............. 360/265.7, 360/245.2, 245.7, 254.3; 206/728
See application file for complete search history.

(56) References Cited

U.S. PATENT DOCUMENTS

| | | | |
|---|---|---|---|
| 5,984,104 A | 11/1999 | Schott et al. | |
| 6,069,773 A | 5/2000 | Frater et al. | |
| 6,157,520 A | 12/2000 | Mangold et al. | |
| 6,163,439 A * | 12/2000 | Jeong | 360/254.3 |
| 6,452,753 B1 | 9/2002 | Hiller et al. | |

(Continued)

FOREIGN PATENT DOCUMENTS

JP 6-60578 3/1994

(Continued)

OTHER PUBLICATIONS

Korean Office Action; mail date Jan. 26, 2006; Application No. 10-2004-0063101.

(Continued)

*Primary Examiner*—Jefferson Evans
(74) *Attorney, Agent, or Firm*—Staas & Halsey LLP

(57) ABSTRACT

An HGA protecting method and member and method of implementing the protecting method and member in a hard disk drive. The HGA includes an actuator, at least one pair of suspensions coupled to the actuator, a flexure having a stationary end fixed to each of the suspensions and a free end, and a slider attached between the stationary end and the free end of the flexure. The HGA protecting member may include a finger restricting excessive movement of the suspension. The finger may further have a flexure supporting portion supporting the free end of the flexure. The HGA protecting member may also be a removable assembly that may be removed after the HGA after assembly of the hard disk drive is complete.

12 Claims, 8 Drawing Sheets

U.S. PATENT DOCUMENTS 7,159,299 B1 * 1/2007 McMunigal et al. ..... 29/603.03
7,293,351 B2 * 11/2007 Pfeiffer et al. ................ 29/737

FOREIGN PATENT DOCUMENTS

| JP | 6-60585 | 3/1994 |
| JP | 11-213581 | 8/1999 |
| KR | P1999-0052532 | 7/1999 |
| WO | WO 03/042996 | 5/2003 |

OTHER PUBLICATIONS

European Search Report issued Jul. 11, 2007 in corresponding European Patent Application No. 05017548.8-1232.

* cited by examiner

HGA PROTECTING METHOD AND MEMBER AND METHOD OF IMPLEMENTING THE HGA PROTECTING METHOD AND MEMBER IN A HARD DISK DRIVE

CROSS-REFERENCE TO RELATED APPLICATIONS

This application claims the priority of Korean Patent Application No. 2004-63101, filed on Aug. 11, 2004, in the Korean Intellectual Property Office, the disclosure of which is incorporated herein in its entirety by reference.

BACKGROUND OF THE INVENTION

1. Field of the Invention

Embodiments of the present invention relate to a recording and/or reproducing apparatus and method, e.g., a hard disk drive, and more particularly, to a head gimbal assembly (HGA) protecting member and method preventing damage to an HGA and a method of implementing the HGA protecting member in the hard disk drive.

2. Description of the Related Art

A hard disk drive (HDD) is a data storage device for a computer, for example, to read data from a hard disk and/or write data on/to the hard disk by using a magnetic head. The hard disk drive can include a base provided with a head gimbal assembly (HGA). The magnetic head can be movably supported on the disk by the HGA. Typically, an HGA protecting member is mounted to the HGA to prevent the HGA and/or components related to the HGA from being damaged in the course of transporting the HGA or while installing the HGA to the base.

FIGS. 1 and 2 respectively illustrate a perspective view and a rear view of the HGA with a conventional HGA protecting member mounted thereto.

Referring to FIGS. 1 and 2, the HGA 10 can include an actuator 16 rotatable a desired angle around a pivot 12, on a base (not shown) of a hard disk drive, two pairs of suspensions 20, 25, 30 and 35 fixed to one end of the actuator 16, and a motor coil 14 on the other end of the actuator 16, with the pivot 12 interposed between the motor coil 14 end and the suspensions end of the actuator 16. The base of the hard disk drive can be provided with a magnet (not shown), to rotate the HGA 10 in a direction according to the Fleming's left-hand rule by interaction between a current input to the motor coil 14 and a magnetic field generated by the magnet.

The suspensions 20, 25, 30 and 35 can be provided with corresponding end-taps 21, 26, 31 and 36, which are supported by a ramp (not shown) when the HGA 10 is parked. Flexures 22, 27, 32 and 37 can be attached to opposite ends of the paired suspensions 20, 25, 30 and 35, and sliders 23, 28, 33 and 38 can be attached to the corresponding flexures 22, 27, 32 and 37, such that paired sliders oppose each other. Magnetic heads (not shown) can be mounted to each of the sliders 23, 28, 33 and 38 to write and/or read data to/on the disk.

During operation of the hard disk drive, the sliders 23, 28, 33 and 38 can be maintained in a floating state at a desired height above the rotating disk. The floating state can be maintained by the balance of power acting on the sliders. In order to keep the balance of force, the paired suspensions 20 and 25 (as well as paired suspensions 30 and 35) are bent to approach the paired of sliders 23 and 28 (and corresponding paired sliders 33 and 38), with the paired sliders facing to each other.

Therefore, while transporting the HGA 10 or while installing the HGA in the base, the facing sliders 23 and 28 and facing sliders 33 and 38 may collide with each other, even after weak impacts. Accordingly, an HGA protecting member 40 may be mounted to the HGA 10 in order to prevent such collision during such transport or installation.

The HGA protecting member 40 typically includes a pair of fingers 43 and 44 along an end thereof. The lower finger 43 is inserted between the pair of lower suspensions 20 and 25, while the upper finger 44 is inserted between the pair of upper suspensions 30 and 35. Although the conventional HGA protecting member 40 is installed on the HGA 10, paired flexures 22 and 27 and paired flexures 32 and 37, as well as paired sliders 23 and 28 and paired sliders 33 and 38, attached thereto, are not supported by the fingers 43 and 44. Therefore, the HGA may still be in danger of being damaged by impact. Also, since the end-taps 21, 26, 31 and 36 of the respective suspensions 20, 25, 30 and 35 are not near the support points of the fingers 43 and 44, collision of the end-taps is still possible.

SUMMARY OF THE INVENTION

Embodiments of the present invention provide an HGA protecting member and method preventing damage of a flexure, suspension, and end-tap of an HGA.

Embodiments of the present invention also provide a member and method for installing an HGA in a hard disk drive by use of an HGA protecting member.

To achieve the above and/or other aspects and advantages, embodiments of the present invention include a head gimbal assembly (HGA) protecting member to be mounted to an HGA including an actuator, at least one pair of suspensions coupled to the actuator, a flexure having a stationary end fixed to each of the suspensions and a free end, with a slider attached between the stationary end and the free end of the flexure, the HGA protecting member including a finger to restrict movement of the suspension, the finger including a flexure supporting portion to support the free end of the flexure.

The suspension may include an end-tap, and the finger includes an end-tap supporting portion to support the end-tap. In addition, the finger may further include a stepped portion formed between the flexure supporting portion and the end-tap supporting portion.

The finger may have a tapered shape so that the finger is insertable between adjacent suspensions without damaging the adjacent suspensions. Further, the HGA protecting member may also include a mounting boss inserted into a throughhole formed at the actuator of the HGA.

To achieve the above and/or other aspects and advantages, embodiments of the present invention include a head gimbal assembly (HGA) protection method for an HGA including an actuator, at least one pair of suspensions coupled to the actuator, a flexure having a stationary end fixed to each of the suspensions and a free end, with a slider attached between the stationary end and the free end of the flexure, the HGA protection method including restricting movement of the suspension with a flexure supporting portion supporting the free end of the flexure.

The restricting of movement may be performed by a finger inserting between adjacent suspensions without damaging the adjacent suspensions.

The restricting of movement further may also support an end-tap at an end of the suspension.

To achieve the above and/or other aspects and advantages, embodiments of the present invention include a method of implementing an HGA for a hard disk drive, the HGA including an actuator, at least one pair of suspensions coupled to the actuator, a flexure having a stationary end fixed to each of the suspensions and a free end, with a slider attached between the stationary end and the free end of the flexure, the method including instituting a first HGA protection restricting movement of the suspension, the restricting being implemented by a first finger including a flexure supporting portion supporting the free end of the flexure, wherein the first finger is inserted between adjacent suspensions so that the flexure supporting portion firmly supports the free end of the flexure, installing the HGA including the first HGA protection in a base of the hard disk drive, and ceasing the first HGA protection of the HGA.

The ceasing of the first HGA protection may include removing the first finger from between the adjacent suspensions.

Further, the suspension may include an end-tap and the first finger includes an end-tap supporting portion supporting the end-tap, wherein the first finger is inserted between the adjacent suspensions so that the end-tap supporting portion supports the end-tap. The first finger may include a stepped portion formed between the flexure supporting portion and the end-tap supporting portion.

The first finger may have a tapered shape so that the first finger is insertable between the adjacent suspensions without damaging the adjacent suspensions.

In addition, the HGA protection may further include having a mounting boss inserted into a through-hole of the actuator of the HGA, wherein when the first HGA protection is implemented, the mounting boss is in the through-hole, and when the first HGA protection is ceased, the mounting boss is not in the through-hole.

The method may further include instituting a second HGA protection supporting a portion of the suspension between parts attached to the actuator and the flexure using a second finger inserted between the adjacent suspensions, wherein the second finger is inserted between the adjacent suspensions, prior to the HGA being installed in the base of the hard disk drive, to support the portion of the suspension between the parts attached to the actuator and the flexure, and ceasing the second HGA protection by removing the second finger between the adjacent suspensions.

The method of implementing the HGA for the hard disk drive may be a method of installing the HGA into the hard disk drive using an HGA protecting member to institute the HGA protection, wherein upon installation of the HGA into the hard disk drive the hard disk drive can be operable upon removal of the HGA protecting member from the HGA.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
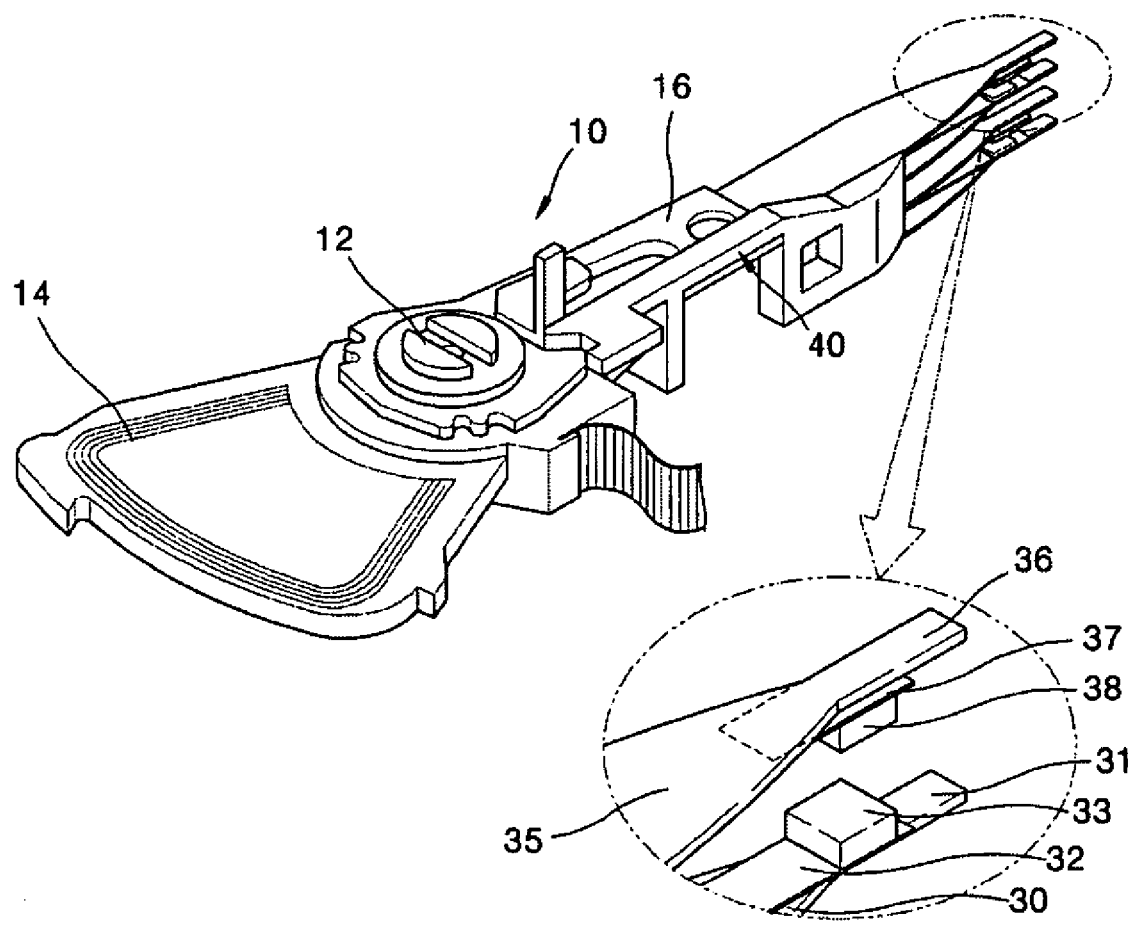
FIGS. 1 and 2 illustrate respective perspective and rear views of an HGA with a conventional HGA protecting member.

Reference will now be made in detail to embodiments of the present invention, examples of which are illustrated in the accompanying drawings, wherein like reference numerals refer to the like elements throughout. The embodiments are described below to explain the present invention by referring to the figures.

Figure 3:
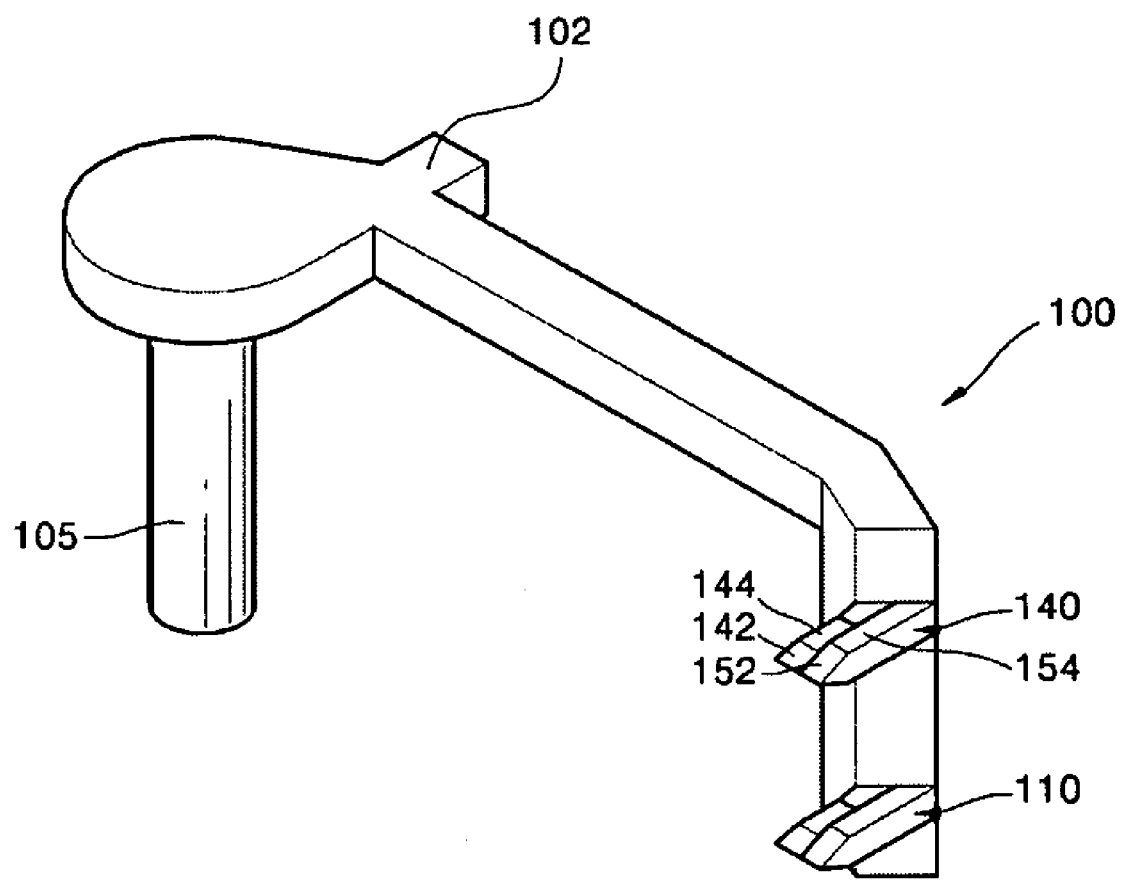
FIG. 3 illustrates a perspective view of an HGA protecting member, according to an embodiment of the present invention.
Figure 4:
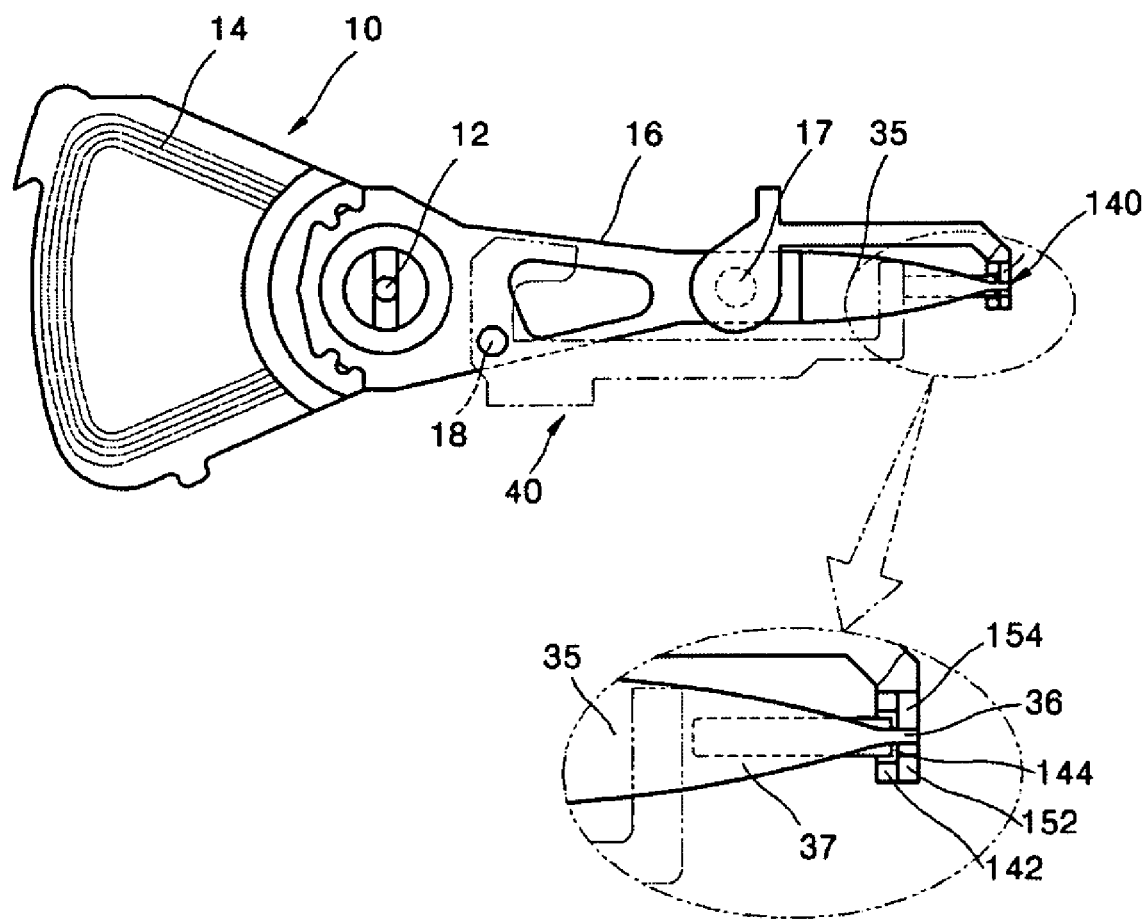
FIGS. 4 and 5 illustrate respective top and front views of an HGA with the HGA protecting member, according to an embodiment of the present invention.
Figure 5:
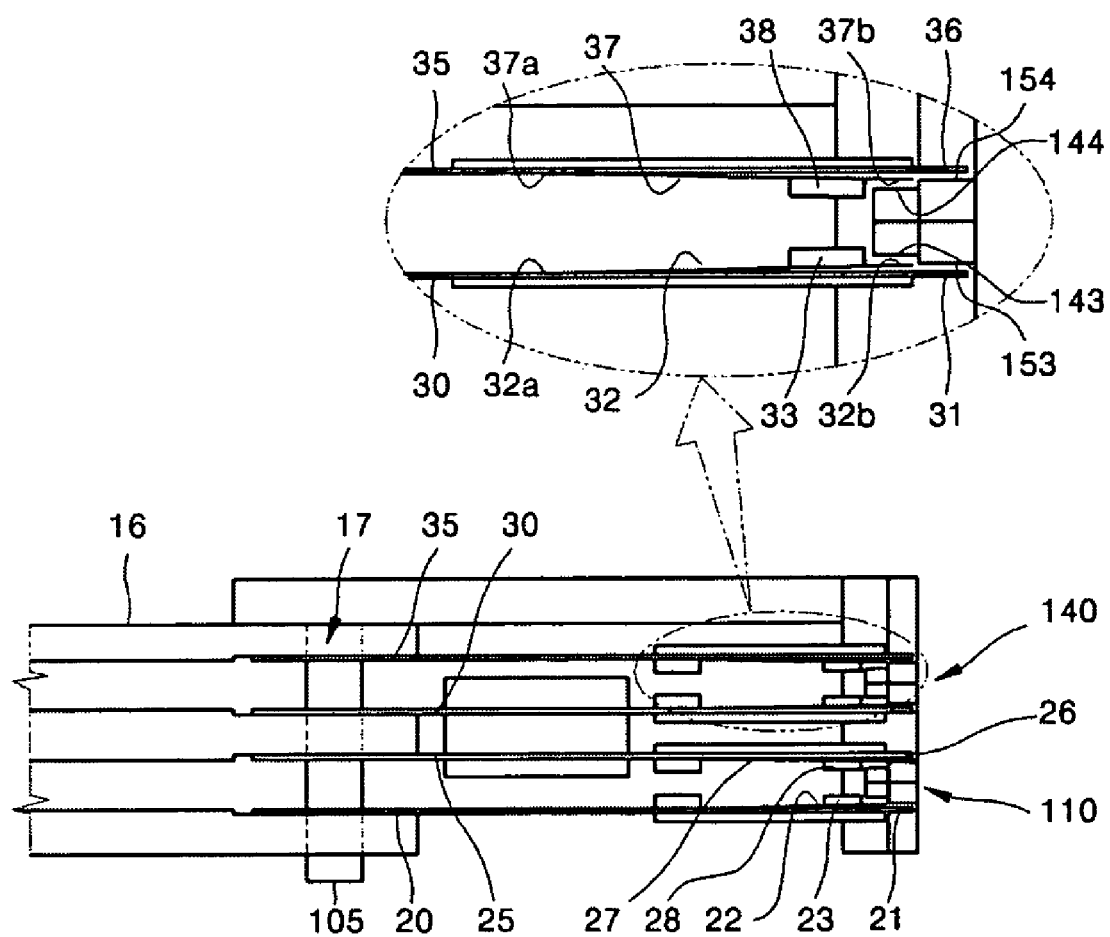

FIG. 3 illustrates a perspective view of an HGA protecting member 100, according to an embodiment of the present invention, with FIGS. 4 and 5 illustrating respective top and front views of an HGA with the HGA protecting member 100.

Referring to FIGS. 3 through 5, the HGA protecting member 100 can be made of a plastic resin by molding, for example, and can include a mounting boss 105 for insertion into a first through-hole 17 of an actuator 16, and fingers 110 and 140 for insertion between paired adjacent suspensions 20 and 25 and paired adjacent suspensions 30 and 35. Also, the HGA protecting member 100 can be provided with a handle 102. The first through-hole 17 of the actuator 16 can be used so that the suspensions 20, 25, 30, and 35 can attach to the actuator 16 by swaging.

As the shape and function of each of the fingers 110 and 140 may be similar to each other, only the insertion of finger 140 between the suspensions 30 and 35 will now be described in detail. Thus, the following description of the finger 140 can be applied to insertion of the finger 110 between the suspensions 20 and 25. The finger 140 can be formed with a wedge shape with inclined surfaces 142 and 152 to be easily inserted between the pair of adjacent suspensions 30 and 35. The finger can also include lower and upper flexure supporting portions 143 (shown in FIG. 5) and 144 extending from the inclined surface 142, and lower and upper end-tap supporting portions 153 (shown in FIG. 5) and 154 extending from the inclined surface 152. A stepped portion is formed between the lower flexure supporting portion 143 and the lower end-tap supporting portion 153, with the lower end-tap supporting portion 153 being located lower than the lower flexure supporting portion 143. Another stepped portion is formed between the upper flexure supporting portion 144 and the upper end-tap supporting portion 154, with the upper end-tap supporting portion 154 being located higher than the upper flexure supporting portion 144. The stepped portions formed between the respective upper and lower flexure supporting portions 143 and 144 and the respective upper and lower end-tap supporting portions 153 and 154 can be designed to correspond to the thickness of the flexures 32 and 37 supported to the respective flexure supporting portions 143 and 144.

The HGA protecting member 100 can be mounted to the HGA 10 to protect the HGA 10 while the HGA 10 is being made and while the HGA 10 is being installed in a base (not shown) of the hard disk drive, for example. The HGA protecting member 100 can be mounted to the HGA by inserting the mounting boss 105 into the first through-hole 17 of the actuator 16 and inserting the finger 110 between the suspensions 20 and 25 and the finger 140 between the suspensions 30 and 35.

Flexures 32 and 37 can be attached to the suspensions 30 and 35 located under/over the finger 140, respectively, so that the flexures face each other. The flexures 32 and 37 include stationary ends 32a and 37a, fixed to the suspensions 30 and 35, and free ends 32b and 37b. The free ends 32b and 37b are extended to front ends of the suspensions 30 and 35, but may not be extended to end-taps 31 and 36, provided at the front ends of the suspensions 30 and 35, respectively. Sliders 33 and 38 are mounted between the stationary ends 32a and 37a and the free ends 32b and 37b of the flexures 32 and 37, respectively, so that the sliders face each other.

When the finger 140 is inserted between the suspensions 30 and 35, the free ends 32b and 37b of the flexures 32 and 37 are spaced apart each other by way of the inclined surface 142. The end-taps 31 and 36 are similarly spaced apart by way of the inclined surface 152. The flexure supporting portions 143 and 144 can support the free ends 32b and 37b of the flexures 32 and 37, respectively, thereby preventing the free ends 32b and 37b from excessively wobbling up and down. Similarly, the end-tap supporting portions 153 and 154 support the end-taps 31 and 36, respectively, thereby preventing the end-taps 31 and 36 from excessively wobbling up and down.

The HGA 10, with the HGA protecting member 100 mounted thereto, can be installed in the base (not shown) of the hard disk drive, and is rotatable around a pivot 12. The finger 110 can be removed from the suspensions 20 and 25 and the finger 140 can be removed from suspensions 30 and 35. The mounting boss 105 can also be removed from the first through-hole 17 to detach the HGA protecting member 100 from the HGA 10.

Figure 2:
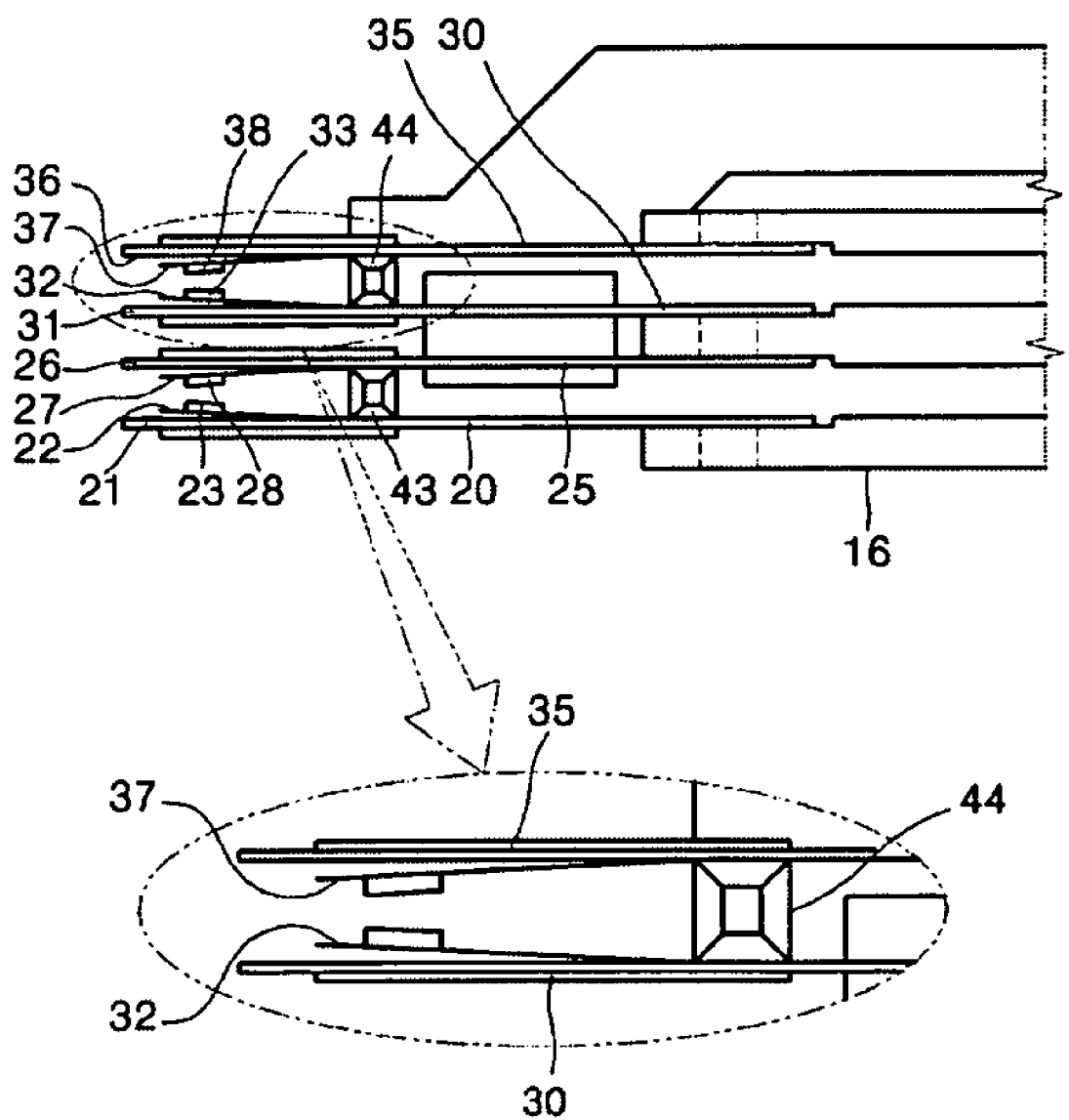

The HGA protecting member 100, according to an embodiment of the present invention, may be installed on the HGA 10 together with a conventional HGA protecting member 40, previously described with reference to FIGS. 1 and 2, so as to more safely protect the HGA from being damaged.

Figure 6:
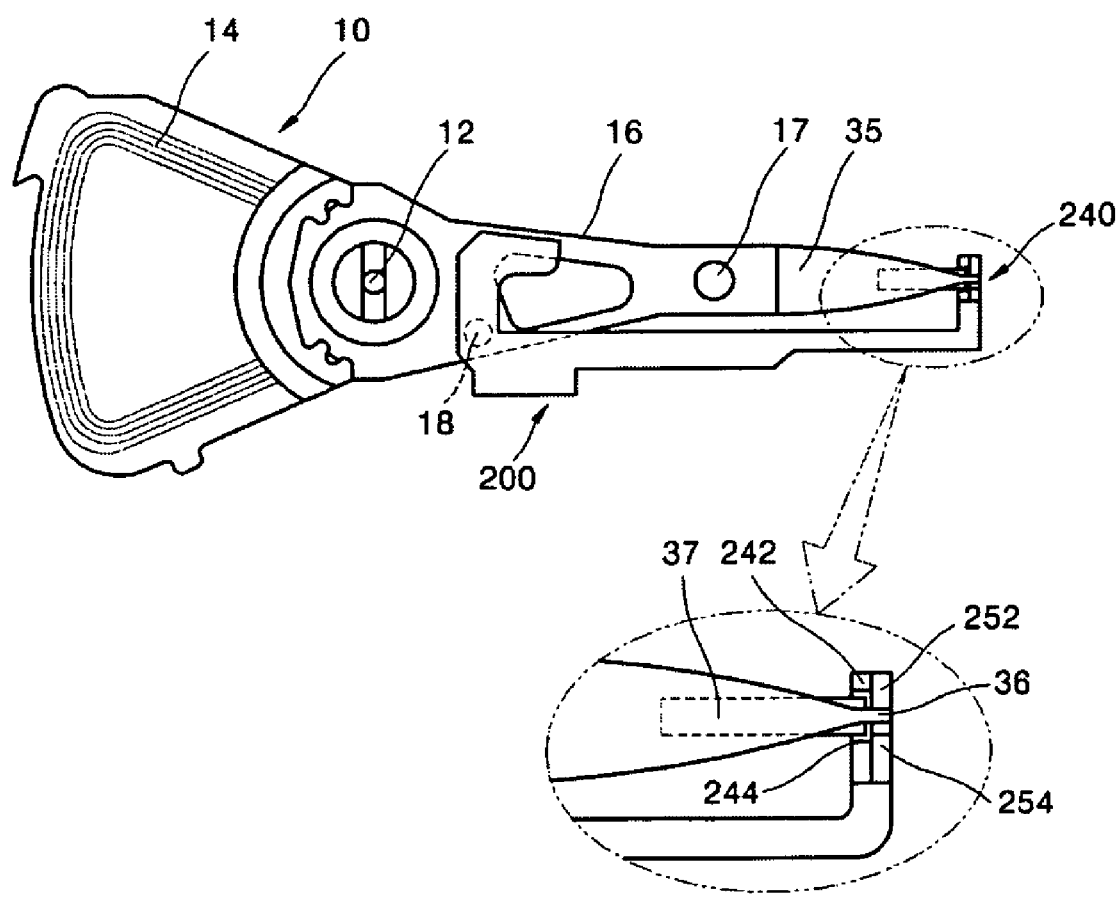
FIGS. 6 and 7 illustrate respective top and rear views of an HGA with an HGA protecting member, according to another embodiment of the present invention.
Figure 7:
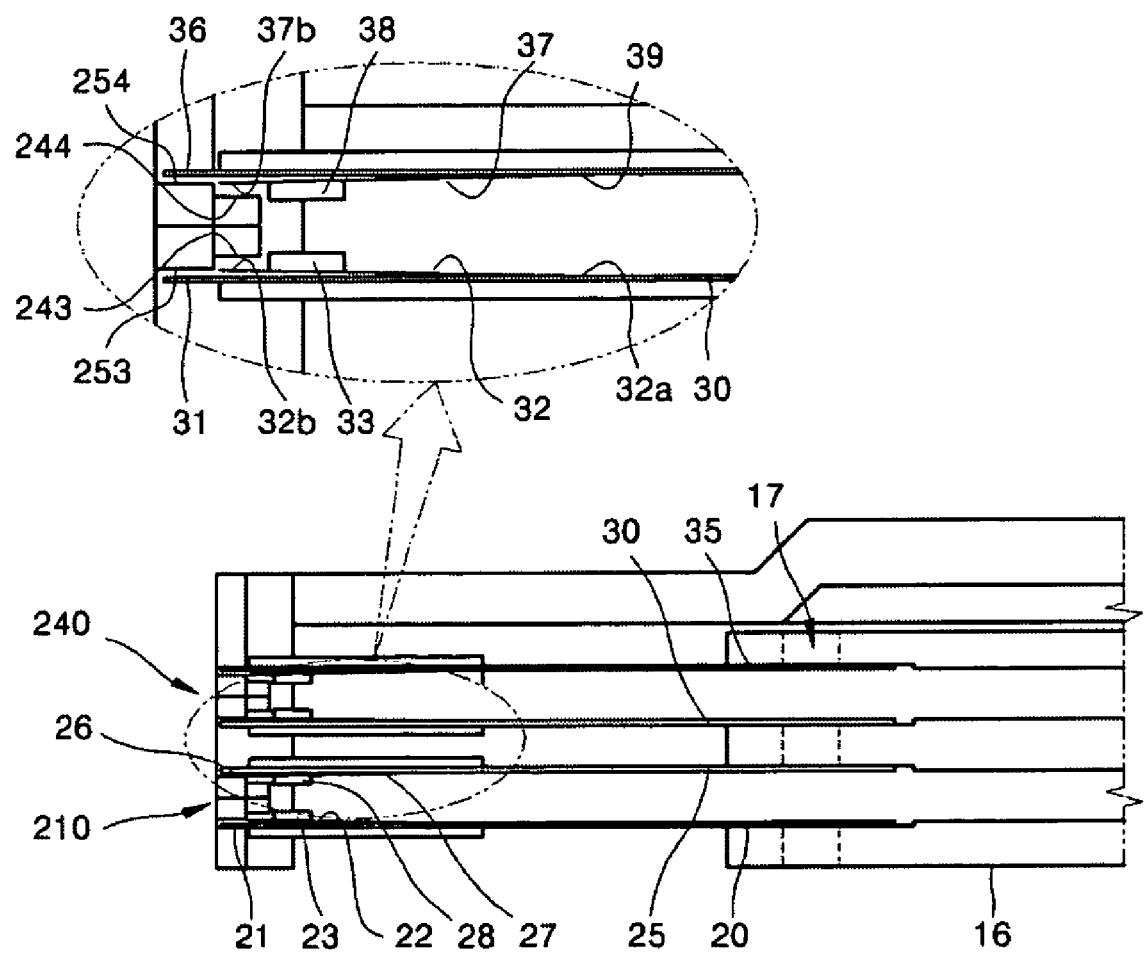

FIGS. 6 and 7 respectively illustrate top and rear views showing an HGA with an HGA protecting member 200, according to other embodiments of the present invention. A structure of the HGA can be similar to that of a conventional HGA, so the detailed description thereof will not be further discussed herein.

Referring to FIGS. 6 and 7, the HGA protecting member 200 can be made of a plastic resin by molding, for example, and may include a mounting boss (not shown) insertable into a second through-hole 18 of an actuator 16, and a pair of fingers 210 and 240 insertable between paired adjacent suspensions 20 and 25 and paired adjacent suspensions 30 and 35. A hole for mounting the conventional HGA protecting member 40 (see FIGS. 1 and 2) to the HGA 10 may also be used as the second through-hole 18, according to an embodiment of the present invention.

The shape and function of the pair of fingers 210 and 240 are similar to those of the fingers 110 and 140, according to an above embodiment, so the detailed description thereof will be further omitted herein.

The HGA protecting member 200 can be mounted on the HGA 10 to protect the HGA 10, e.g., until the HGA 10 is completed and installed in a base (not shown) of the hard disk drive.

When the finger 240 is inserted between the suspensions 30 and 35, the free ends 32b and 37b of the flexures 32 and 37 are spaced apart from each other by way of the inclined surface 242, and the end-taps 31 and 36 are spaced from each other by way of the inclined surface 252. Also the flexure supporting portions 243 and 244 can support the free ends 32b and 37b of the flexures 32 and 37, respectively, thereby preventing the free ends 32b and 37b from wobbling up and down. Similarly, end-tap supporting portions 253 and 254 can support the end-taps 31 and 36, respectively, thereby preventing the end-taps 31 and 36 from wobbling up and down. This description of the finger 240 may be similarly applied to another finger 210.

The HGA 10, with the HGA protecting member 200 mounted thereto, can be installed in the base (not shown) of the hard disk drive, and may be rotated around the pivot 12. The finger 210 may be removed from the suspensions 20 and 25 and finger 24 may be removed from suspensions 30 and 35. The mounting boss (not shown) can be removed from the second through-hole 18, detaching the HGA protecting member 200 from the HGA 10.

Figure 8:
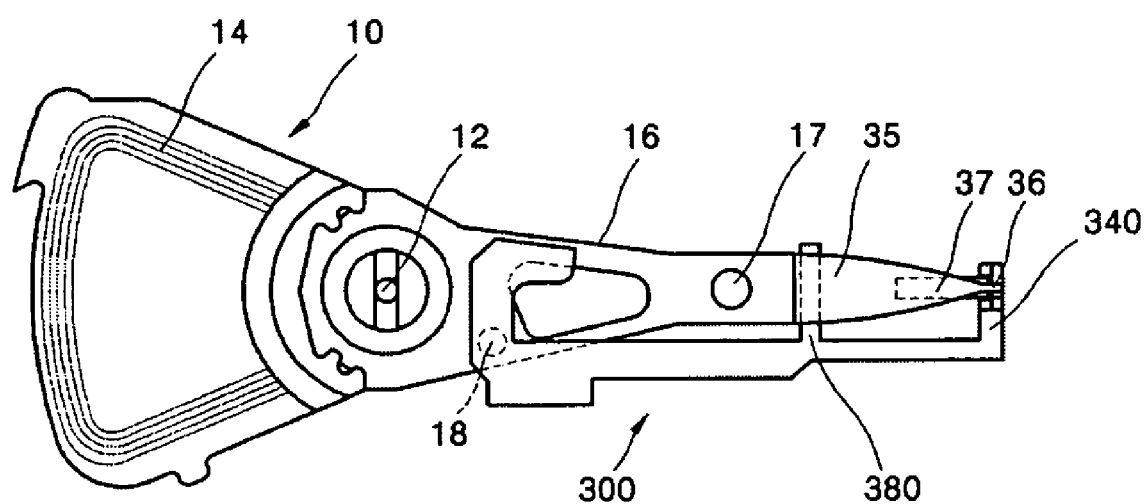
FIG. 8 illustrates a top view of an HGA with an HGA protecting member, according to still another embodiment of the present invention.

FIG. 8 illustrates a top view of an HGA with an HGA protecting member 300, according to another embodiment of the present invention.

Referring to FIG. 8, the HGA protecting member 300 may include a first finger 340 for supporting the flexure 37 and the end-top 36, and a second finger 380 for supporting the portion of the suspension 35 between parts attached to the actuator 16 and the flexure 37. The first finger 340 may be similar to the finger 140 (see FIG. 3) of an above embodiment, and the second finger 380 may be similar to the finger 44 (see FIG. 2) of a conventional HGA protection member, for example. Accordingly, the detailed description of the corresponding first and second fingers will be omitted further herein.

With the above description, when the HGA protecting member embodiments of the present invention are mounted on an HGA, a finger of the HGA protecting member can support a flexure of the HGA and an end-tap of a suspension, thereby preventing the suspension, the end-tap, and the flexure from wobbling during transport or during installation of the HGA, thereby preventing damage of the flexure and the slider, as well as the magnetic head mounted onto the slider.

Further, an installation of the HGA in the hard disk drive using the HGA protecting member may prevent damage of the HGA in the course of installing the HGA in the base of the hard disk drive. Additional embodiments are also available, e.g., an HGA protecting member may include only one pair of suspensions and may be provided with only one finger.

Thus, although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A head gimbal assembly (HGA) protecting member to be mounted to an HGA including an actuator, at least one pair of suspensions coupled to the actuator, a flexure having a stationary end fixed to each of the suspensions and a free end, with a slider attached between the stationary end and the free end of the flexure, the HGA protecting member comprising:

a finger to restrict movement of the suspension,
the finger including a flexure supporting portion to support the free end of the flexure, wherein the suspension includes an end-tap, and the finger includes an end-tap supporting portion to support the end-tap.

2. The HGA protecting member of claim 1, wherein the finger further comprises a stepped portion formed between the flexure supporting portion and the end-tap supporting portion.

3. A head gimbal assembly (HGA) protection method for an HGA comprising an actuator, at least one pair of suspensions coupled to the actuator, a flexure having a stationary end fixed to each of the suspensions and a free end, with a slider attached between the stationary end and the free end of the flexure, the HGA protection method comprising:

restricting movement of the suspension with a flexure supporting portion supporting the free end of the flexure, wherein the restricting of movement further comprises supporting an end-tap at an end of the suspension.

4. A method of implementing an HGA for a hard disk drive, the HGA including an actuator, at least one pair of suspensions coupled to the actuator, a flexure having a stationary end fixed to each of the suspensions and a free end, with a slider attached between the stationary end and the free end of the flexure, the method comprising:

instituting a first HGA protection restricting movement of the suspension, the restricting being implemented by a first finger comprising a flexure supporting portion supporting at the free end of the flexure, wherein the first finger is inserted between adjacent suspensions so that the flexure supporting portion firmly supports the free end of the flexure;

installing the HGA comprising the first HGA protection in a base of the hard disk drive; and ceasing the first HGA protection of the HGA.

5. The method of claim 4, wherein the ceasing of the first HGA protection comprises removing the first finger from between the adjacent suspensions.

6. The method of claim 4, wherein the first finger has a tapered shape so that the first finger is insertable between the adjacent suspensions without damaging the adjacent suspensions.

7. The method of claim 4, wherein the HGA protection further comprises having a mounting boss inserted into a through-hole of the actuator of the HGA, wherein when the first HGA protection is implemented, the mounting boss is in the through-hole, and when the first HGA protection is ceased, the mounting boss is not in the through-hole.

8. The method of claim 4, further comprising:

instituting a second HGA protection supporting a portion of the suspension between parts attached to the actuator and the flexure using a second finger inserted between the adjacent suspensions, wherein the second finger is inserted between the adjacent suspensions, prior to the HGA being installed in the base of the hard disk drive, to support the portion of the suspension between the parts attached to the actuator and the flexure; and ceasing the second HGA protection by removing the second finger between the adjacent suspensions.

9. The method of claim 4, wherein the method of implementing the HGA for the hard disk drive is a method of installing the HGA into the hard disk drive using an HGA protecting member to institute the HGA protection, wherein upon installation of the HGA into the hard disk drive the hard disk drive can be operable upon removal of the HGA protecting member from the HGA.

10. The method of claim 4, wherein the instituting of the first HGA protection restricting movement of the suspension includes restricting movement of the flexure and the suspension supporting the flexure, the restricting being implemented by the first finger comprising the flexure supporting portion supporting the free end of the flexure and a suspension supporting portion supporting an end of the suspension, wherein when the first finger is inserted between adjacent suspensions the suspension supporting portion firmly supports the suspension.

11. A method of implementing an HGA for a hard disk drive, the HGA including an actuator, at least one pair of suspensions coupled to the actuator, a flexure having a stationary end fixed to each of the suspensions and a free end, with a slider attached between the stationary end and the free end of the flexure, the method comprising:

instituting a first HGA protection restricting movement of the suspension, the restricting being implemented by a first finger comprising a flexure supporting portion supporting the free end of the flexure, wherein the first finger is inserted between adjacent suspensions so that the flexure supporting portion firmly supports the free end of the flexure;

installing the HGA comprising the first HGA protection in a base of the hard disk drive; and ceasing the first HGA protection of the HGA, wherein the suspension comprises an end-tap and the first finger includes an end-tap supporting portion supporting the end-tap, wherein the first finger is inserted between the adjacent suspensions so that the end-tap supporting portion supports the end-tap.

12. A method of implementing an HGA for a hard disk drive, the HGA including an actuator, at least one pair of suspensions coupled to the actuator, a flexure having a stationary end fixed to each of the suspensions and a free end, with a slider attached between the stationary end and the free end of the flexure, the method comprising:

instituting a first HGA protection restricting movement of the suspension, the restricting being implemented by a first finger comprising a flexure supporting portion supporting the free end of the flexure, wherein the first finger is inserted between adjacent suspensions so that the flexure supporting portion firmly supports the free end of the flexure;

installing the HGA comprising the first HGA protection in a base of the hard disk drive; and ceasing the first HGA protection of the HGA, wherein the first finger comprises a stepped portion formed between the flexure supporting portion and the end-tap supporting portion.

\* \* \* \* \*

UNITED STATES PATENT AND TRADEMARK OFFICE
CERTIFICATE OF CORRECTION

PATENT NO. : 7,573,681 B2 Page 1 of 1
APPLICATION NO. : 11/201117
DATED : August 11, 2009
INVENTOR(S) : Chul-woo Lee et al.

It is certified that error appears in the above-identified patent and that said Letters Patent is hereby corrected as shown below:

Title Page, Item (57) Abstract, Line 12, change "after the HGA after" to --after--.

Signed and Sealed this

Seventeenth Day of November, 2009

David J. Kappos
*Director of the United States Patent and Trademark Office*